United States Patent
Laraqui et al.

(10) Patent No.: US 9,705,625 B2
(45) Date of Patent: Jul. 11, 2017

(54) OPTICAL NETWORK TERMINAL AND A METHOD THEREIN FOR MAINTENANCE OF THE SAME

(75) Inventors: Kim Laraqui, Solna (SE); Stefan Dahlfort, Stockholm (SE); Patryk Urban, Vällingby (SE); Gemma Vall-llosera, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/368,331

(22) PCT Filed: Feb. 16, 2012

(86) PCT No.: PCT/SE2012/050165
§ 371 (c)(1),
(2), (4) Date: Jun. 24, 2014

(87) PCT Pub. No.: WO2013/122519
PCT Pub. Date: Aug. 22, 2013

(65) Prior Publication Data
US 2015/0207587 A1    Jul. 23, 2015

(51) Int. Cl.
*H04B 10/27*    (2013.01)
*H04J 14/02*    (2006.01)
(Continued)

(52) U.S. Cl.
CPC .......... *H04J 14/0227* (2013.01); *H04B 10/27* (2013.01); *H04J 14/0272* (2013.01);
(Continued)

(58) Field of Classification Search
USPC ..................................... 398/68, 79, 95, 135
See application file for complete search history.

(56) References Cited

U.S. PATENT DOCUMENTS

| | | | |
|---|---|---|---|
| 6,144,665 A | 11/2000 | Karasawa | |
| 2002/0172216 A1* | 11/2002 | Asashiba | H04J 3/14 370/442 |
| 2007/0153823 A1 | 7/2007 | Wojtowicz | |
| 2008/0056714 A1* | 3/2008 | Konstan | H04B 10/0773 398/38 |

(Continued)

FOREIGN PATENT DOCUMENTS

| | | |
|---|---|---|
| CN | 101610239 A | 12/2009 |
| EP | 2341675 A1 | 7/2011 |

(Continued)

OTHER PUBLICATIONS

Lee, W., et al., "Bidirectional WDM-PON Based on Gain-Saturated Reflective Semiconductor Optical Amplifiers", IEEE Photonics Technology Letters, Nov. 1, 2005, pp. 2460-2462, vol. 17, No. 11.

*Primary Examiner* — David Payne
*Assistant Examiner* — Omar S Ismail
(74) *Attorney, Agent, or Firm* — Coats & Bennett, PLLC

(57) ABSTRACT

An ONT and a method therein for maintenance and administration of the ONT are provided. The ONT is comprised in an Optical Distribution Network, ODN. The method comprises connecting 210 an OLT in the ODN to a maintenance unit comprised in the ONT when a first signal is received from the OLT instructing the ONT to enter a maintenance mode. The method comprises updating 220 existing maintenance and administration information in the maintenance unit, the maintenance and administration information relating to the operation of the ONT when receiving new maintenance and administration information from the OLT. The method comprises connecting 230 the OLT to a host which host is connected to the ONT when receiving, from the OLT, a second signal instructing the ONT to enter an operation mode, or after a predetermined period of time; and operating 240 the ONT in accordance with the updated maintenance and administration information in the maintenance unit.

8 Claims, 6 Drawing Sheets

(51) Int. Cl.
*H04Q 11/00* (2006.01)
*H04L 12/24* (2006.01)

(52) U.S. Cl.
CPC ....... *H04L 41/082* (2013.01); *H04Q 11/0067* (2013.01); *H04Q 2011/0079* (2013.01); *H04Q 2213/1301* (2013.01)

(56) References Cited

U.S. PATENT DOCUMENTS

| | | | |
|---|---|---|---|
| 2008/0056720 A1* | 3/2008 | Sitton | H04B 10/27 398/98 |
| 2008/0267634 A1* | 10/2008 | Effenberger | H04L 25/4908 398/128 |
| 2009/0290868 A1* | 11/2009 | Yin | H04Q 11/0067 398/16 |
| 2009/0304384 A1 | 12/2009 | Li | |
| 2011/0211827 A1 | 9/2011 | Soto et al. | |
| 2011/0274426 A1* | 11/2011 | Yang | H04B 10/071 398/16 |
| 2011/0318008 A1* | 12/2011 | Kubo | H04L 12/12 398/66 |
| 2012/0045201 A1* | 2/2012 | Skubic | H04B 10/272 398/38 |
| 2012/0121252 A1 | 5/2012 | Kim et al. | |

FOREIGN PATENT DOCUMENTS

| | | |
|---|---|---|
| KR | 100675137 B1 | 1/2007 |
| WO | 2011010759 A1 | 1/2011 |
| WO | 2011134237 A1 | 11/2011 |

\* cited by examiner

OPTICAL NETWORK TERMINAL AND A METHOD THEREIN FOR MAINTENANCE OF THE SAME

TECHNICAL FIELD

The present disclosure relates to Passive Optical Networks and in particular to maintenance and administration of an Optical Network Terminal comprised in a Passive Optical Network.

BACKGROUND

A Passive Optical Network, PON, or a Wavelength Division Multiplexing PON, WDM-PON, may be employed as a transport network within a client network. A WDM PON network comprises active equipment (switches, lasers, etc) and passive elements such as fibre and wavelength splitters. An ODN refers only to the fibre infrastructure and passive elements.

FIG. 1a is a schematic overview of an exemplifying PON. In general and very simplified, a PON comprises an Optical Line Terminal, OLT, which is connected to a plurality of Optical Network Terminal, ONTs. In FIG. 1a, an OLT 160 is comprised in an ODN. FIG. 1 also illustrates the OLT 160 being connected to three ONTs 100a, 100b and 100c. The ONTs are in turn either incorporated with a host 170a and 170b or connected to a host 170c. The ODN is also referred to as a transport domain. There may be additional equipment and/or devices connected to the hosts 170a-170c and to the OLT 160 so that the equipment/devices connected to the hosts 170a-170c may communicate with equipment/devices connected to the ONT 160 by means of the ODN. Any additional equipment and/or devices connected to the hosts 170a-170c and to the OLT 160 are referred to as a client domain.

In one example, the hosts 170a-170c constitute a radio base station, RBS, or antenna, by means of which users may access the network and communicate with other equipment/devices. In another example, the host is a set-top-box. The host may be a combination of software and hardware. In still an example, the host is the point by which a user accesses services offered by an operator, which services are provided over the ODN.

It may happen that an operator may need to update, configure or perform maintenance functions on the ONTs in the ODN. In order to do so, one example is the operator accessing the host, via the ONT, and then access the ONT via the host. In order for the operator to access the host, the operator must know and "understand" the protocol used by the host. In a typical ODN, the number of ONTs is very big and each host connected to the respective ONTs need not employ the same protocol, making it very cumbersome for the operator to access the different hosts. Further, such a solution requires there to be a control interface between the ONT and the host. Looking at FIG. 1a, ONT3 100c does not have such a control interface with its host-C 170c wherein this solution does not even work.

When managing the WDM-PON, one solution to measure the performance of the WDM-PON is to inject Optical Time Domain Reflectometer, OTDR, pulses into the ODN. OTDR pulses may be employed to monitor the ODN but not to monitor the ONT nor to perform any configuration, updating or maintenance actions. It may be possible to make use of the OTDR function by complimenting it with protocol based facilities such as ONT Management Control Interface, OMCI, in Gigabit PON, GPON. However, such a solution would be client dependent and it would not be generically applicable to any service carried over the WDM-PON.

In case the ONT has Medium Access Control, MAC, capability, the OLT can manage the ONT via Ethernet Operation, Administration and Maintenance, OAM, OMCI or similar MAC based methods. The method to perform configuration, updating or maintenance actions of the ONT(s) will then be different for different network protocols, e.g. Ethernet, Common Public Radio Interface, CPRI, and subject to the availability and limitations of these client networks or protocols. Further, such an approach also assumes that OAM is triggered at the MAC layer.

Looking again at FIG. 1a, assume that Host-A 170a is an Ethernet based host. Then it is possible to use Simple Network Management Protocol, SNMP, User Datagram Protocol, UDP, or Ethernet to get access to ONT1 100a via the SNMP enabled host 170a. Further assume that Host-B 170b uses CPRI. Then the operator must use Radio Access Network, RAN, vendor specific CPRI OAM facilities on Host-B 170b in order to get access to ONT2 100b via Host-B 170b. This illustrates that it may become almost impossible to manage a vast plurality of ONTs being connected to different hosts using different protocols.

SUMMARY

The object is to obviate at least some of the problems outlined above. In particular, it is an object to provide an ONT and a method therein for maintenance and administration of the ONT, wherein an OLT may access the ONT and perform maintenance and administration actions of the ONT. These objects and others may be obtained by providing an ONT and a method in an ONT according to the independent claims attached below.

According to an aspect a method in an Optical Network Termination, ONT, for maintenance and administration of the ONT is provided. The ONT is comprised in an Optical Distribution Network, ODN. The method comprises connecting an OLT in the ODN to a maintenance unit comprised in the ONT when a first signal is received from the OLT instructing the ONT to enter a maintenance mode. The method further comprises updating existing maintenance and administration information in the maintenance unit, the maintenance and administration information relating to the operation of the ONT when receiving new maintenance and administration information from the OLT. Still further, the method comprises connecting the OLT to a host which host is connected to the ONT when receiving, from the OLT, a second signal instructing the ONT to enter an operation mode, or after a predetermined period of time; and operating the ONT in accordance with the updated maintenance and administration information in the maintenance unit.

According to an aspect, an Optical Network Termination, ONT, comprised in an Optical Distribution Network, ODN, is provided. The ONT comprises a maintenance unit adapted to control operation of the ONT. The ONT further comprises a connecting module adapted to connect an OLT in the ODN to the maintenance unit comprised in the ONT when a first signal is received from the OLT instructing the ONT to enter a maintenance mode. The ONT comprises an updating module adapted to update existing maintenance and administration information in the maintenance unit, the maintenance and administration information relating to the operation of the ONT when receiving new maintenance and administration information from the OLT. The connecting module further is adapted to connect the OLT to a host which host is connected to the ONT when receiving, from the OLT, a second signal instructing the ONT to enter an operation mode, or after a predetermined period of time, wherein the maintenance unit further is adapted to operate the ONT in accordance with the updated maintenance and administration information in the maintenance unit.

The ONT and the method therein have several advantages. The ONT enables in-band Operations, Administration and Maintenance, OAM, capabilities on Wavelength Division Multiplexing Passive Optical Network, WDM-PON, ONTs. Such ONTs may be deployed on a massive scale in mobile and fixed broadband access networks. By means of the method, there is no need to assign separate wavelengths to the different ONTs for the sole purpose of OAM. This saves resources. Further, there is no need to access the ONT via the host, wherein the method may be employed with any protocol supported by the ONTs and the OLT, regardless of the protocols supported by the host.

BRIEF DESCRIPTION OF DRAWINGS

Embodiments will now be described in more detail in relation to the accompanying drawings, in which.

DETAILED DESCRIPTION

Briefly described, an Optical Network Termination, ONT, and a method therein are provided for managing the ONT, wherein an Optical Line Terminal, OLT, is enabled to access the ONT and update existing maintenance and administration information in the ONT.

It shall be pointed out that the ONT represents, or is situated at, the termination of the optical fibre cable. Another entity which may be arranged at the termination of the optical fibre cable is an Optical Network Unit, ONU. In this disclosure, the term ONT is used throughout which is to represent an ONT or an ONU, whichever is arranged at the termination of the optical link or the optical fibre cable.

An embodiment of a method in an ONT for maintenance and administration of the ONT will now be described with reference to FIG. 2. The ONT is comprised in an Optical Distribution Network, ODN.

Figure 2:
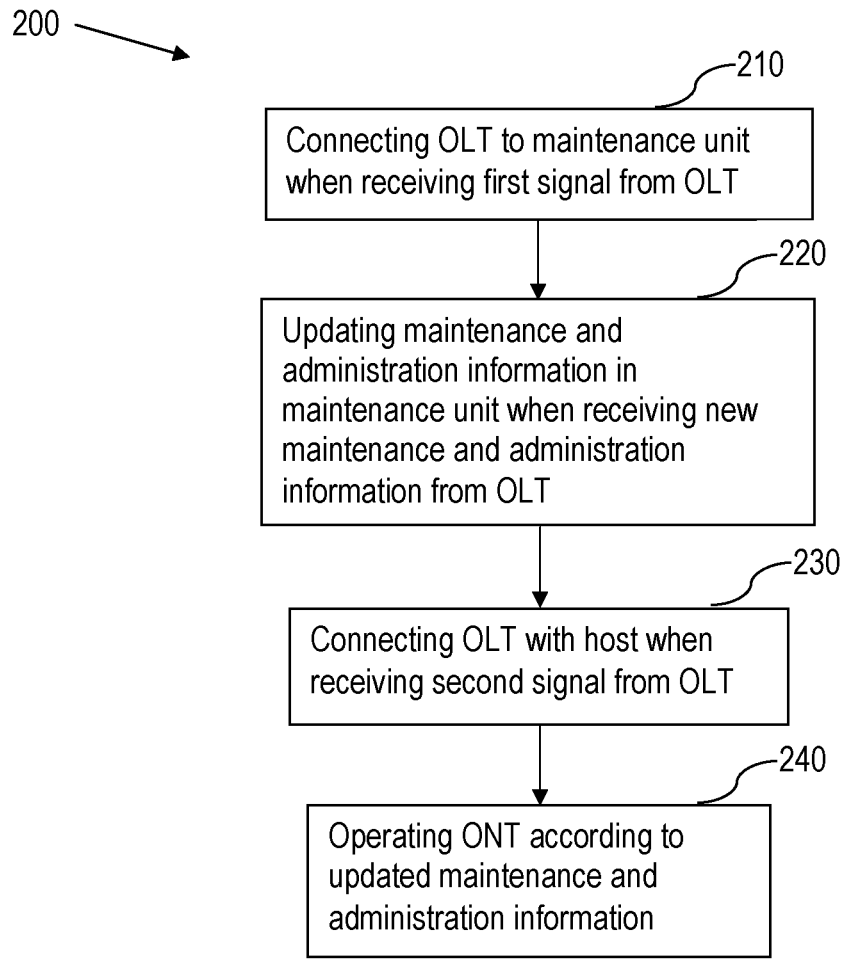
FIG. 2 is a flowchart of a method in an ONT according to an exemplifying embodiment.

FIG. 2 illustrates the method 200 in the ONT comprising connecting 210 an OLT in the ODN to a maintenance unit comprised in the ONT when a first signal is received from the OLT instructing the ONT to enter a maintenance mode. The method further comprises updating 220 existing maintenance and administration information in the maintenance unit, the maintenance and administration information relating to the operation of the ONT when receiving new maintenance and administration information from the OLT. Still further, the method comprises connecting 230 the OLT to a host which host is connected to the ONT when receiving, from the OLT, a second signal instructing the ONT to enter an operation mode, or after a predetermined period of time; and operating 240 the ONT in accordance with the updated maintenance and administration information in the maintenance unit.

In this embodiment, the OLT needs to update maintenance and administration information in the ONT. The maintenance and administration information control the operation of the ONT and is stored in the ONT in the maintenance unit. In normal operation, also referred to as the operating mode, the OLT communicates with the ONT, wherein any equipment/devices connected to the hosts 170a-170c may communicate with equipment/devices connected to the ONT 160 by means of the ODN. In other words, the OLT communicates with the hosts 170a-170c via the ONTs. At a point in time, the OLT determines to update the maintenance and administration information in the ONT. In order to do so, the OLT needs to access the maintenance unit in which the maintenance and administration information is stored in the ONT. The OLT sends a signal to the ONT instructing the ONT to enter a maintenance mode. When the ONT receives the signal, the ONT enters the maintenance node, wherein the ONT connects the OLT to the maintenance unit comprised in the ONT. When the OLT is connected to the maintenance unit comprised in the ONT, the ONT receives new maintenance and administration information from the OLT. The OLT then updates existing maintenance and administration information in the maintenance unit with the received new maintenance and administration information from the OLT. When the OLT has transferred the new maintenance and administration information to the ONT, the OLT sends a second signal instructing the ONT to enter an operation mode, wherein the ONT connects the OLT to the host which host is connected to the ONT. Alternatively, the ONT connects the OLT to the host which host is connected to the ONT after a predetermined time from when the ONT entered the maintenance node. When the ONT is in the operation mode, the ONT operates in accordance with the updated maintenance and administration information in the maintenance unit.

When the ONT is in the maintenance node, the traffic between the OLT and the host is interrupted. Therefore, an operator may choose to perform any updates of the ONT at times during the day or night where the traffic load is at a low level. In this manner, the update of the ONT may possibly not even be noticed by the host or a user of any equipment connected to the host, as the user is likely to not be using the equipment connected to the host.

In other words, the ONT can be said to create a demarcation point between different parts of the network, service layer vs. optical access layer.

The method has several advantages. The method enables in-band Operations, Administration and Maintenance, OAM, capabilities on Wavelength Division Multiplexing Passive Optical Network, WDM-PON, ONTs. Such ONTs may be deployed on a massive scale in mobile and fixed broadband access networks. By means of the method, there is no need to assign separate wavelengths to the different ONTs for the sole purpose of OAM. This saves resources. Further, there is no need to access the ONT via the host, wherein the method may be employed with any protocol supported by the ONTs and the OLT, regardless of the protocols supported by the host.

Figure 1A:
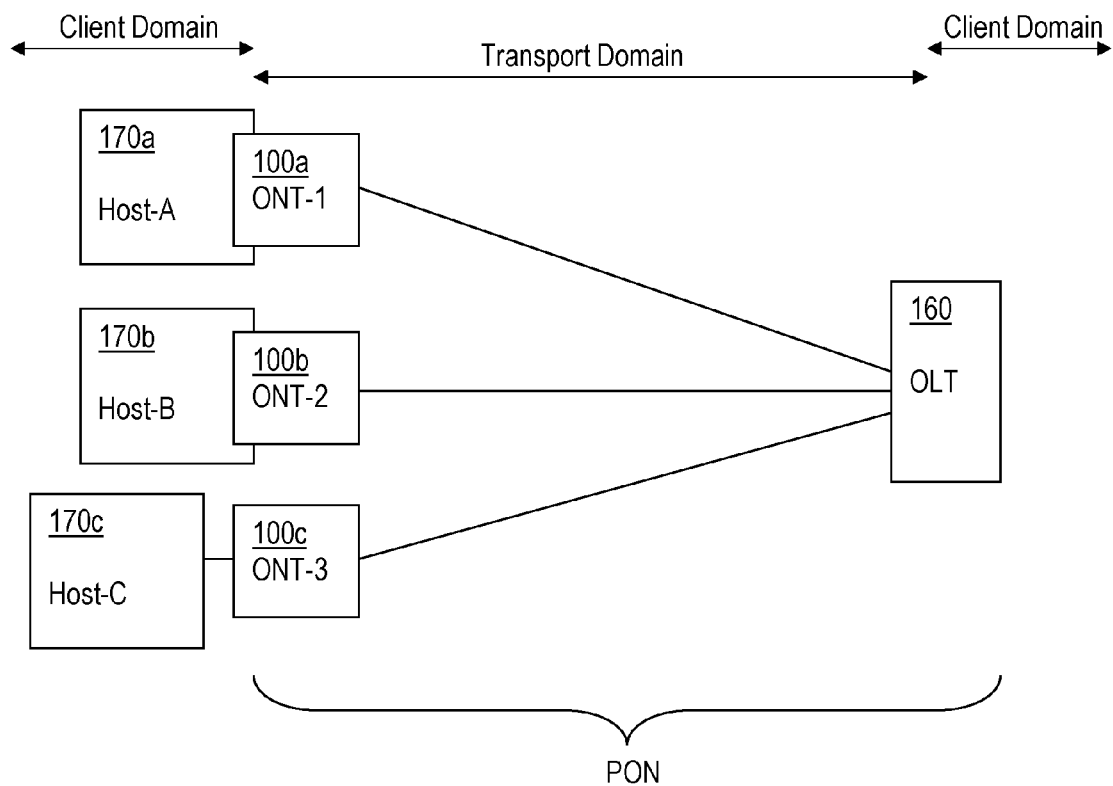
FIG. 1a is a schematic overview of an exemplifying PON.
Figure 1B:
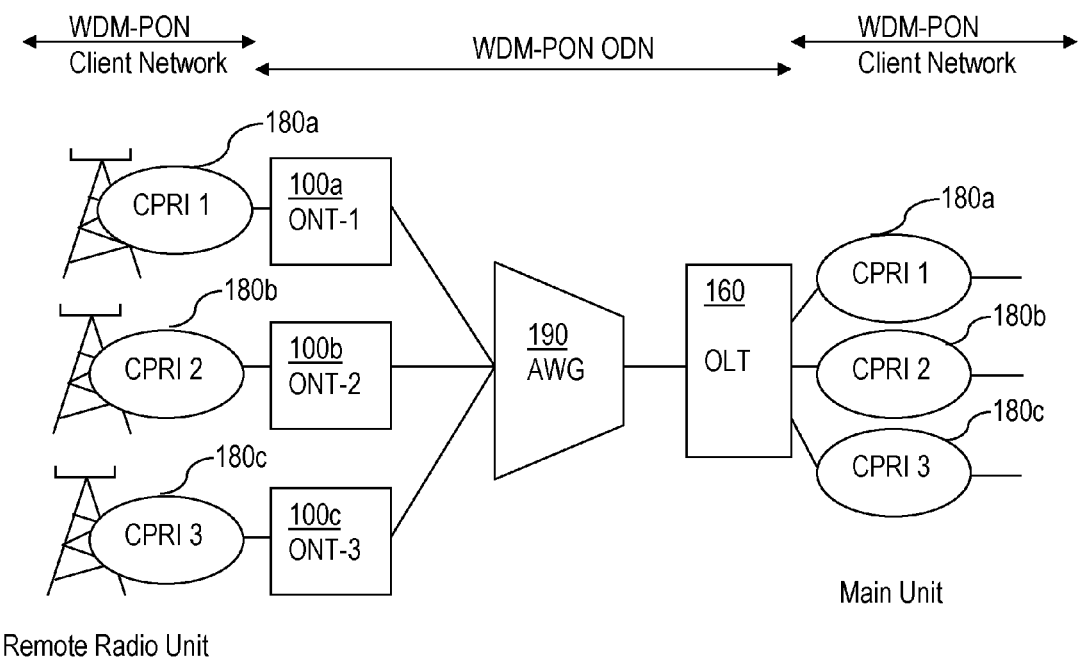
FIG. 1b is a schematic overview of a WDM-PON.

FIG. 1b is a schematic overview of a WDM-PON. FIG. 1b illustrates a client network, which is using WDM-PON, the client network consisting of a Radio Access Network, RAN, split into a Remote Radio Unit, RRU, part and a Main Unit, MU, part. In this example, transmission requirements mandate the use of the Time Division Multiplexing, TDM, based protocol CPRI. Initially, the ONTs 100a, 100b and 100c tune their respective downlink and uplink wavelengths automatically. Once a WDM-PON channel is set up, CPRI interfaces 180a-180c on the MU and the RRU communicate with one another over the ODN. FIG. 1b also illustrates the ODN comprising an Arrayed Wavelength Grating, AWG, 190 which is arranged to filter wavelengths according to each RRU. FIG. 1b illustrates a more detailed example of FIG. 1a. In FIG. 1b, the RRU comprising antennas or Radio Base stations, RBSs, correspond to the hosts 170a-170c in FIG. 1a.

According to an embodiment, the first received signal comprises a predetermined pattern of bits.

The first signal, instructing the ONT to enter the maintenance mode and connecting the OLT with the maintenance unit in the ONT, must be understood by the ONT so that the ONT does enter the maintenance mode and connects the OLT with the maintenance unit. In this example, the signal comprises a predetermined pattern of bits, which the ONT interprets as the instruction to enter the maintenance mode. This is an example of in-band optical signalling by means of which, the ONT is instructed to connect the OLT with the maintenance unit, or in other words to terminate the wavelength to the maintenance unit.

According to an embodiment, the predetermined pattern of bits comprises a predetermined number of consecutive zeros, "0", corresponding to low optical intensity.

This embodiment makes use of functions referred to as laser shutdown and loss of signal. If the receiver, i.e. the ONT in this example, detects laser shutdown or loss of signal, the ONT automatically enters the maintenance mode.

According to still an embodiment, the first received signal comprises a predetermined number of ones, "1", corresponding to high optical intensity, causing saturation of the ONT triggering the ONT to enter the maintenance mode.

These are two examples of the first signal. These two examples will now be described with reference to FIGS. 3a-3c.

Figure 3A:
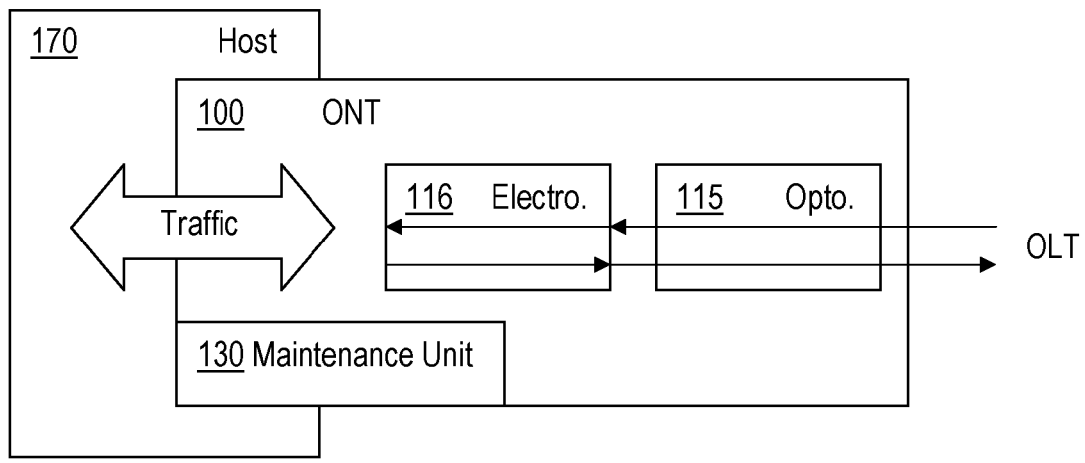
FIG. 3a is a block diagram of an ONT for detecting signals comprising mode instructions being in operation mode.
Figure 3B:
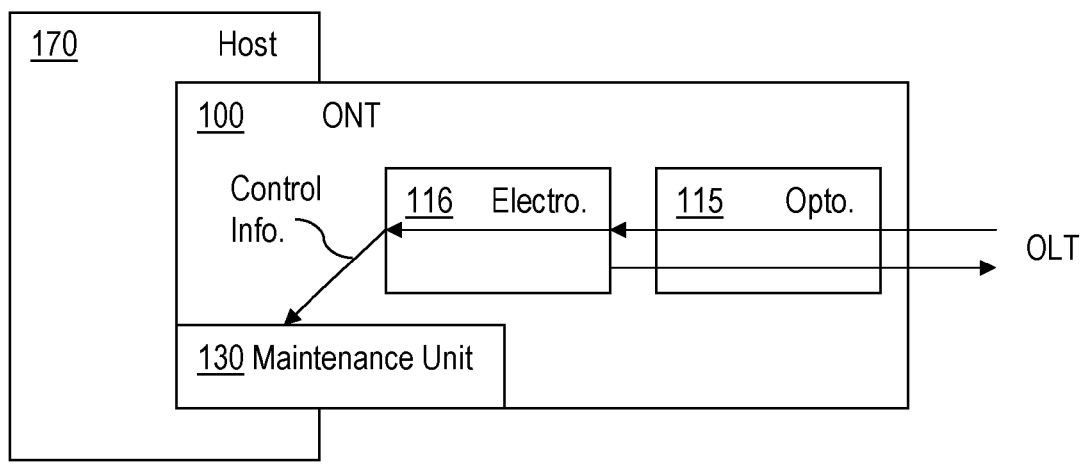
FIG. 3b is a block diagram of an ONT for detecting signals comprising mode instructions being in maintenance mode.

FIGS. 3a and 3b illustrate an ONT 100 comprising an optical domain 115 and en electrical domain 116. The ONT 100 further comprises a maintenance unit 130. The ONT 100 communicates with or is connected to an OLT. In FIG. 3a, the ONT 100 is further connected to and communicates with a host 170 during operation mode. In FIG. 3b, the ONT 100 is connected to a host 170, but the ONT is in maintenance mode and connects the OLT with the maintenance unit 130 in order for the OLT to update maintenance and administration information in the maintenance unit 130. In FIG. 3b, it is exemplified that an optical signal is received from the OLT by the optical domain and undergoes optical to electrical conversion. Depending on the optical signal, an electrical signal is obtained in the electrical domain corresponding to the optical signal in the optical domain. In this example, it is the electrical domain 116 of the ONT 100 that connects the OLT with the maintenance unit 130.

Figure 3C:
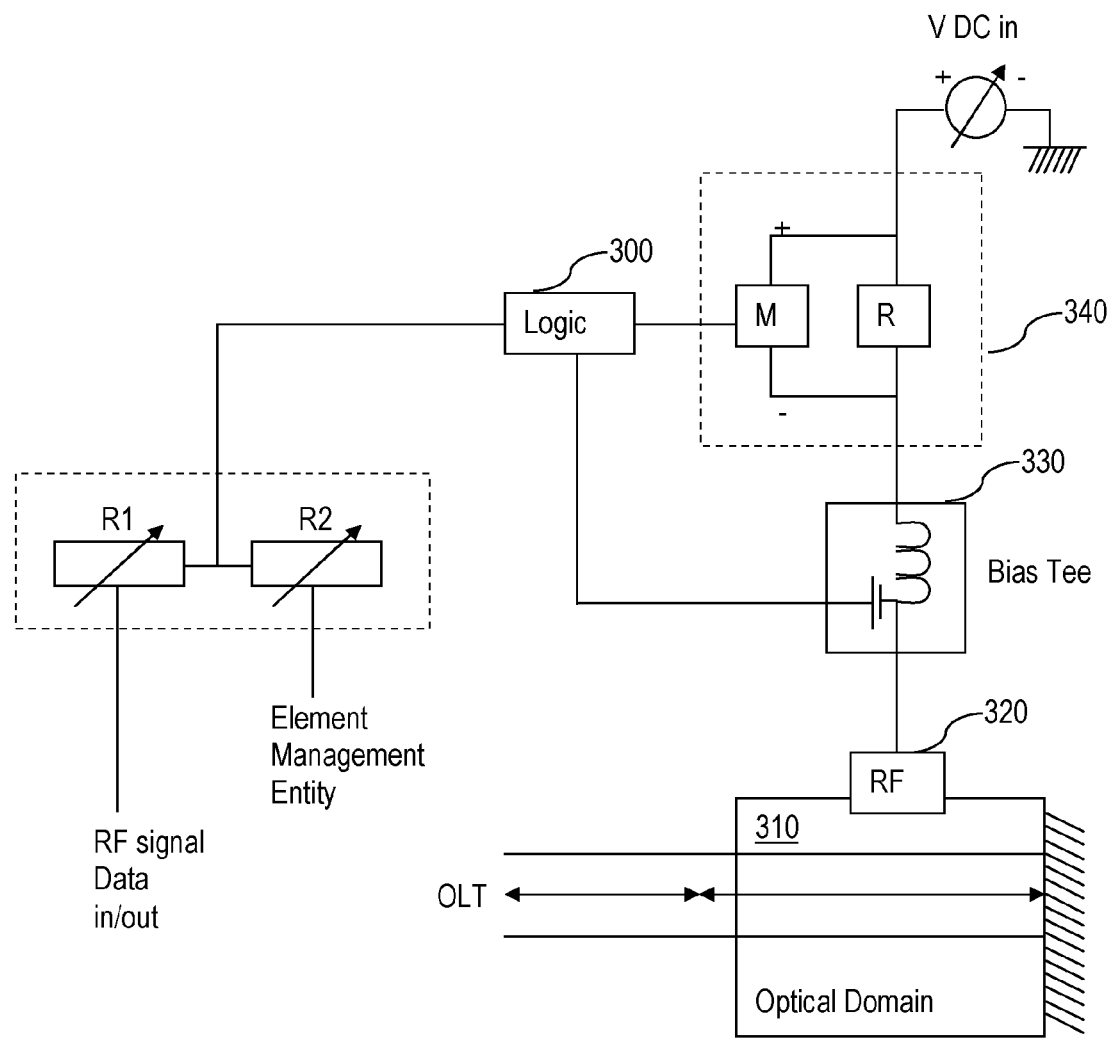
FIG. 3c is a block diagram of an exemplifying solution for controlling the mode of the ONT.

FIG. 3c is a block diagram exemplifying an arrangement in an ONT for detecting signals comprising mode instructions. The arrangement in the ONT is in an example comprised in an Electrical domain of the ONT, except for the optical domain 310. Signals from the OLT is received in the optical domain and converted to electrical signals which are output from the RF 320. Further, the arrangement in the ONT comprises a Bias Tee 330 and a logic entity 300. The Bias Tee 330 divides the electrical signal and the signal is measured by the arrangement 340 as a voltage, V DC in. The result of the measurement is provided to the logic entity 300.

The arrangement in the ONT also comprises two loads R1 and R2 which are a generic load and not only resistance. As long as the VDC in is lower than a predetermined threshold, then R2 is loaded with kΩ and R1 is loaded with 0 (zero) Ω. In such a situation, user data is transmitted transparently, corresponding to the OLT being connected to the host as described above. The loading of R1 and R2 is controlled by the logical entity 300.

If V DC in increases and becomes larger than the predetermined threshold, then R1 is loaded with kΩ and R2 is loaded with 0 (zero) Ω. The ONT then becomes saturated, wherein the ONT enters maintenance mode and connects the OLT with the maintenance unit as described above. When the OLT is connected with the maintenance unit, the maintenance unit is able to receive maintenance and administration information.

If this scheme is used as the first signal instructing the ONT to enter the maintenance mode, a reverse scheme may be used as the second signal instructing the ONT to enter the operation mode. To enter, or going back to, the operation mode, a reverse saturation is performed wherein the V DC in falls below the predetermined threshold. Then R2 is again loaded with kΩ and R1 is again loaded with 0 (zero) Ω.

The control of the load of R1 and R2 is done by the logic entity 300. Depending on the detected signal, which may be a predetermined sequence of zeros and ones, a predetermined sequence of zeros or a predetermined sequence of ones, the logic entity 300 will control the load of R1 and R2 such that the ONT becomes saturated or not saturated, wherein the ONT switches between maintenance mode and operation mode.

According to an embodiment, the reception of the first signal starts a maintenance timer, wherein the ONT remains in the maintenance mode until the maintenance timer expires or the second signal is received from the OLT instructing the ONT to enter the operation mode.

In this example, the ONT starts the maintenance timer when the ONT receives the first signal instructing the ONT to enter the maintenance mode. The maintenance timer has a specific length, which is chosen such that the OLT will have time to transmit new maintenance and administration information to the ONT with a certain probability. In case the maintenance timer expires before the ONT receives the second signal, the ONT enters the operation mode. In the event of a fault or delay in the exchanging of the new maintenance and administration information, the maintenance timer safeguards that the ONT does not remain in the maintenance mode for too long. When the ONT is in the maintenance mode, the communication in the client domain is interrupted. The interruption is tolerable for relatively short periods of time, especially if they take place at a point in time where the traffic load is minimal. However, should the second signal be lost for any reason, the ONT may risk remaining in the maintenance mode if the maintenance timer is not employed.

Embodiments herein also relate to an ONT comprised in an ODN, the ONT comprising a maintenance unit adapted to control operation of the ONT.

The ONT has the same objects, technical features and advantages as the method performed therein. The ONT will therefore be described in brief in order to avoid unnecessary repetition.

FIG. 4a is a block diagram of an ONT according to an exemplifying embodiment.

Figure 4:
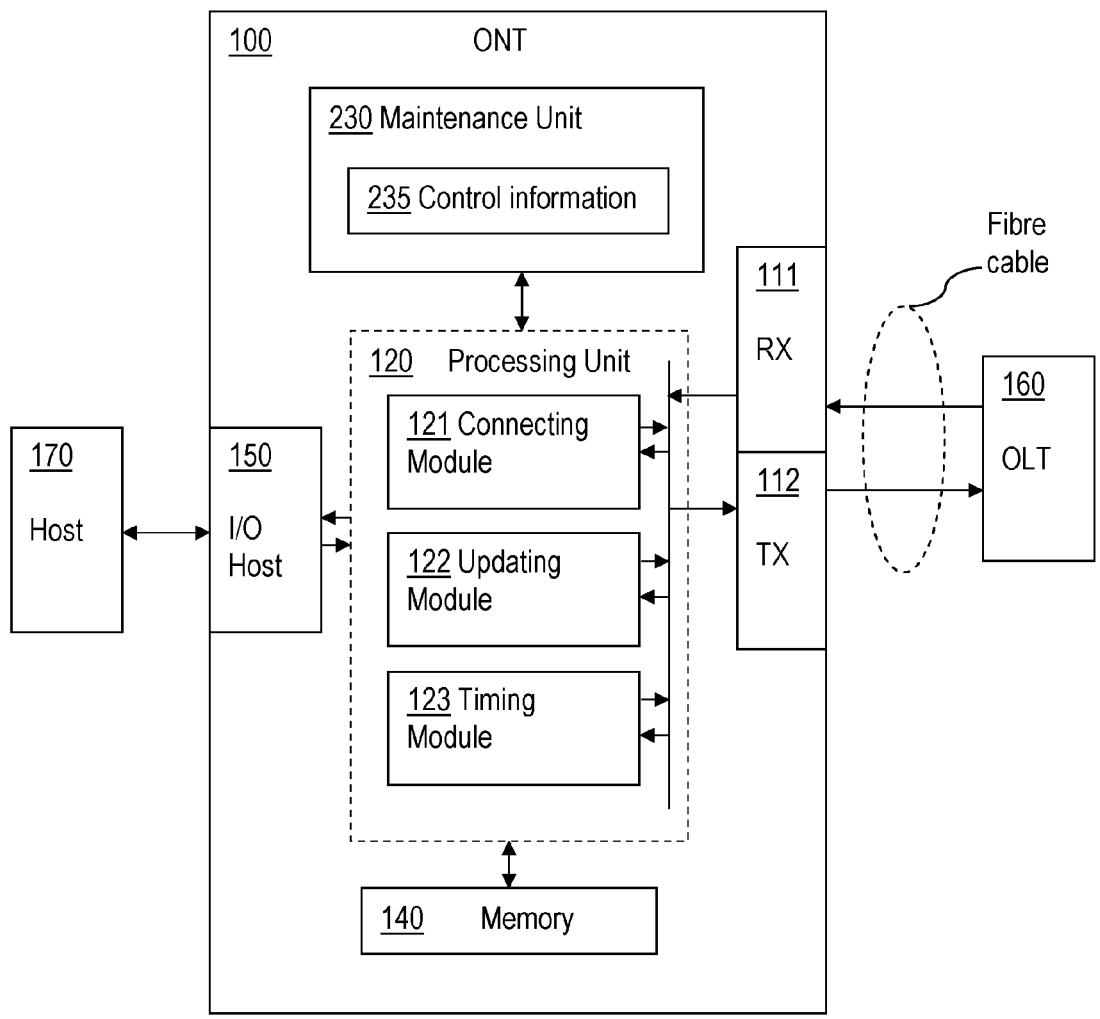
FIG. 4 is a block diagram of an ONT according to an exemplifying embodiment.

FIG. 4 illustrates the ONT 100, comprised in an ODN, the ONT 100 comprising a maintenance unit 130 adapted to control operation of the ONT 100. The ONT further comprises a connecting module 121 adapted to connect an OLT 160 in the ODN to the maintenance unit 130 comprised in the ONT 100 when a first signal is received from the OLT 160 instructing the ONT 100 to enter a maintenance mode. The ONT 100 comprises an updating module 122 adapted to update existing maintenance and administration information in the maintenance unit 130, the maintenance and administration information relating to the operation of the ONT 100 when receiving new maintenance and administration information from the OLT 160. The connecting module 121 further is adapted to connect the OLT to a host 170 which host is connected to the ONT 100 when receiving, from the OLT 160, a second signal instructing the ONT to enter an operation mode, or after a predetermined period of time, wherein the maintenance unit 130 further is adapted to operate the ONT 100 in accordance with the updated maintenance and administration information in the maintenance unit 130.

The ONT has several advantages. The ONT enables in-band Operations, Administration and Maintenance, OAM, capabilities on Wavelength Division Multiplexing Passive Optical Network, WDM-PON, ONTs. Such ONTs may be deployed on a massive scale in mobile and fixed broadband access networks. By means of the method, there is no need to assign separate wavelengths to the different ONTs for the sole purpose of OAM. This saves resources. Further, there is no need to access the ONT via the host, wherein the method may be employed with any protocol supported by the ONTs and the OLT, regardless of the protocols supported by the host.

FIG. 4 illustrates the ONT 100 comprising a memory 140 and an interface 150 to the host 170. Further, FIG. 4 illustrates the ONT 100 comprising a receiving arrangement 111 and a transmitting arrangement 112 by means of which the ONT 100 communicates with the OLT 160. The receiving and transmitting arrangements 111 and 112 may be separate arrangements or one Interface arrangement to the OLT 160. Alternatively, in an example, the OLT 100 comprises one single interface arrangement by means of which the ONT 100 may communicate with both the OLT 160 and the host 170. The ONT 100 may comprise additional or other modules, units or devices than those schematically illustrated in FIG. 4 for performing the actions described above.

According to an embodiment, the first received signal comprises a predetermined pattern of bits.

According to still an embodiment, the predetermined pattern of bits comprises a predetermined number of consecutive zeros, "0", corresponding to low optical intensity.

According to yet an embodiment, the first received signal comprises a predetermined number of ones, "1", corresponding to high optical intensity, causing saturation of the ONT, wherein the ONT is adapted to enter the maintenance mode.

According to an embodiment, the ONT 100 further comprises a timing unit 123 adapted to start a maintenance timer when the ONT receives the first signal, wherein the ONT is adapted to remain in the maintenance mode until the maintenance timer expires or the second signal is received from the OLT instructing the ONT to enter the operation mode, wherein the connecting module 121 is adapted to connect the OLT to the host 170.

It shall be pointed out that it is still possible to perform remote updates or maintenance in the host with this solution presented above. This solution is transparent to the host and in case of an operator wanting to perform any actions on or in the host. The ONT will remain in its operation mode wherein the OLT is connected to the host.

It should be noted that FIGS. 2a, 2b and 4 merely illustrates various functional units and modules in the ONT in a logical sense. The functions in practice may be implemented using any suitable software and hardware means/circuits etc. Thus, the embodiments are generally not limited to the shown structures of the ONT and the functional units and modules. Hence, the previously described exemplary embodiments may be realised in many ways. For example, one embodiment includes a computer-readable medium having instructions stored thereon that are executable by the processing unit for emulating the method steps as described above in conjunction with FIG. 2. The instructions executable by the computing system and stored on the computer-readable medium perform the method steps of the present invention as set forth in the claims.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method for maintenance and administration of an Optical Network Termination (ONT) comprised in an Optical Distribution Network (ODN), the method comprising:
  connecting an Optical Line Termination (OLT) in the ODN to a maintenance unit comprised in the ONT in response to a first optical in-band signal being received from the OLT instructing the ONT to enter a maintenance mode;
  updating existing maintenance and administration information in the maintenance unit, the maintenance and administration information relating to operation of the ONT when receiving new maintenance and administration information from the OLT;
  connecting the OLT to a host connected to the ONT in response to at least one of:
    receiving, from the OLT, a second optical in-band signal instructing the ONT to enter an operation mode, said operation mode being different from the maintenance mode;
    expiration of a predetermined period of time;
  operating the ONT in accordance with the updated maintenance and administration information in the maintenance unit;
  wherein reception of the first optical in-band signal starts a maintenance timer;
  wherein the ONT remains in the maintenance mode until the maintenance timer expires or the second optical in-band signal is received from the OLT instructing the ONT to enter the operation mode.

2. The method of claim 1, wherein the first received optical in-band signal comprises a predetermined pattern of bits.

3. The method of claim 2, wherein the predetermined pattern of bits comprises a predetermined number of consecutive zeroes corresponding to low optical intensity.

4. The method of claim 1, wherein the first received optical in-band signal comprises a predetermined number of ones, corresponding to high optical intensity, causing saturation of the ONT to thereby trigger the ONT to enter the maintenance mode.

5. An Optical Network Termination (ONT) comprised in an Optical Distribution Network (ODN), the ONT comprising:
one or more processing circuits configured to function as:
a maintenance unit configured to control operation of the ONT;
a connecting module configured to connect an Optical Line Termination (OLT) in the ODN to the maintenance unit in response to a first optical in-band signal being received from the OLT instructing the ONT to enter a maintenance mode;
an updating module configured to update existing maintenance and administration information in the maintenance unit, the maintenance and administration information relating to the operation of the ONT when receiving new maintenance and administration information from the OLT;
wherein the connecting module further is configured to connect the OLT to a host connected to the ONT in response to at least one of:
receipt, from the OLT, of a second optical in-band signal instructing the ONT to enter an operation mode, said operation mode being different from the maintenance mode;
expiration of a predetermined period of time;
wherein the maintenance unit further is configured to operate the ONT in accordance with the updated maintenance and administration information in the maintenance unit; and
a timing circuit configured to start a maintenance timer in response to the ONT receiving the first optical in-band signal;
wherein the ONT is configured to remain in the maintenance mode until the maintenance timer expires or the second optical in-band signal is received from the OLT instructing the ONT to enter the operation mode;
wherein the connecting module is configured to connect the OLT to the host.

6. The ONT of claim 5, wherein the first received optical in-band signal comprises a predetermined pattern of bits.

7. The ONT of claim 6, wherein the predetermined pattern of bits comprises a predetermined number of consecutive zeroes, corresponding to low optical intensity.

8. The ONT of claim 5, wherein the first received optical in-band signal comprises a predetermined number of ones, corresponding to high optical intensity, causing saturation of the ONT, wherein the ONT is configured to enter the maintenance mode in response to saturation of the ONT.

* * * * *